United States Patent [19]
Petisce

[11] Patent Number: 5,845,034
[45] Date of Patent: Dec. 1, 1998

[54] RADIATION-CURABLE, OPTICAL GLASS FIBER COATING COMPOSITION AND OPTICAL GLASS FIBER DRAWING METHOD

[75] Inventor: James R. Petisce, Elgin, Ill.

[73] Assignee: DSM NV, Heerlen, Netherlands

[21] Appl. No.: 993,309

[22] Filed: Dec. 18, 1997

Related U.S. Application Data

[62] Division of Ser. No. 685,033, Jul. 22, 1996, abandoned.

[51] Int. Cl.⁶ .............................. G02B 6/02; G02B 6/00
[52] U.S. Cl. ..................... 385/128; 385/141; 427/513; 522/14
[58] Field of Search ................................ 385/128–130, 385/144, 141; 427/513, 519, 520; 522/14, 96, 181; 526/301

[56] References Cited

U.S. PATENT DOCUMENTS

| | | | |
|---|---|---|---|
| 4,129,417 | 12/1978 | White | 436/66 |
| 4,399,225 | 8/1983 | Hansen et al. | 436/34 |
| 4,507,407 | 3/1985 | Kluger . | |
| 4,601,725 | 7/1986 | Keller . | |
| 4,751,254 | 6/1988 | Kluger . | |
| 4,775,748 | 10/1988 | Kluger . | |
| 4,912,203 | 3/1990 | Kluger . | |
| 4,932,750 | 6/1990 | Ansel et al. | 385/141 |
| 4,985,546 | 1/1991 | Miley . | |
| 5,135,972 | 8/1992 | Kluger . | |
| 5,149,800 | 9/1992 | Kluger . | |
| 5,302,627 | 4/1994 | Field . | |
| 5,629,164 | 5/1997 | Rivers | 436/524 |

FOREIGN PATENT DOCUMENTS

| | | |
|---|---|---|
| 0 390 415 | 10/1990 | European Pat. Off. . |
| 0 432 931 | 6/1991 | European Pat. Off. . |
| 01 204 902 | 8/1989 | Japan . |

OTHER PUBLICATIONS

G.A. George, et al.; Characterization of the Cure of TGDDM/DDS Epoxy Resins by Chemiluminescence I. Spectral and Thermal Analysis; Journal of Applied Polymer Science, 1987; vol. 33, 2281–2292.

Primary Examiner—Akm E. Ullah
Attorney, Agent, or Firm—Pillsbury Madison & Sutro LLP

[57] ABSTRACT

Provided is a radiation-curable, optical glass fiber coating composition containing at least one radiation-curable oligomer or monomer, and at least one chromophoric indicator selected so as to be susceptible to destruction of its chromophoric characteristic upon exposure to radiation and present in an amount which becomes substantially colorless when exposed to a level of radiation sufficient to cure said radiation-curable, optical glass fiber coating composition, wherein said at least one chromophoric indicator has a color which is distinguishable from a base color of said radiation-curable, optical glass fiber coating composition in cured form. The invention also provides a method of making the coating composition. The invention further provides a coated optical glass fiber and a method of making a coated optical glass on a fiber drawing tower. Also provided is a cable and telecommunications system.

3 Claims, 3 Drawing Sheets

RADIATION-CURABLE, OPTICAL GLASS FIBER COATING COMPOSITION AND OPTICAL GLASS FIBER DRAWING METHOD

This is a division of application Ser. No. 08/685,033, filed Jul. 22, 1996 now abandoned.

FIELD OF THE INVENTION

This invention relates to radiation-curable, optical glass fiber coating compositions and to a method of controlling the cure thereof. More particularly the invention provides a coating composition having an effective amount of a chromophoric indicator component which will normally provide a visible color to the uncured composition but which will becomes colorless at the level of radiation for the desired cure of the coating composition. The invention also relates to an optical glass fiber drawing method, and more particularly to an optical glass fiber drawing method in which an initially colored coating applied to the optical glass fiber becomes colorless at the level of radiation exposure required to achieve the desired cure of the coating.

BACKGROUND OF THE INVENTION

Optical glass fibers are generally coated with two superposed radiation-cured coatings, which together form a primary coating. The coating which is in direct contact with the glass is called the inner primary coating and the overlaying coating is called the outer primary coating.

The inner primary coating is usually a relatively soft coating providing environmental protection to the glass fiber and resistance, inter alia, to the well-known phenomenon of microbending. Microbending in the coated fiber can lead to attenuation of the signal transmission capability of the coated fiber and is therefore undesirable. The outer primary coating, which is on the exposed surface of the coated fiber, is typically a relatively harder coating designed to provide a desired resistance to physical handling forces, such as those encountered when the fiber is cabled.

Such primary coating systems are typically prepared from radiation-curable, optical glass fiber coating compositions (hereinafter referred to as "radiation-curable composition"). It is a characteristic of such systems that the curing proceeds upon exposure to a radiation source, typically a UV-radiation source, for a time sufficient to provide a full cure of the coating compositions at the level of intensity of such source.

As the demand for coated optical glass fibers has increased, manufacturers must respond by adding more fiber drawing production lines and by attempting to increase the linear line speeds of the existing fiber drawing production lines. In the latter case, one factor which will determine the upper limit for the line speed will be the curing rate characteristics of the radiation-curable compositions, for a given radiation source and intensity.

If the line speed is increased to the extent that cure rate time requirements of the radiation-curable composition are not provided, the radiation-curable composition will not have received a sufficient amount of radiation to cause complete cure, or cross-linking, of the radiation-curable composition. The production linear line speed is generally inversely related to the amount of radiation striking the optical glass fiber. That is, as the production line speed is increased the amount of radiation exposure to the radiation-curable composition during the production process will necessarily decrease for a given radiation source. Incomplete cure of the radiation-curable composition is undesirable and must be avoided because then the desired protective properties of the incompletely cured primary coating may not be achieved and/or the incompletely cured primary coating may retain tackiness (giving problems in subsequent handling) or a malodorous odor may be present, and there may also be an increase in the extractables (undesirable) in the supposedly-cured coating.

Fiber production is therefore confronted with a problem that increases in production line speed are difficult to achieve without jeopardizing the cured coating quality.

If the production line speed is increased without careful consideration and balancing of the associated reduction in radiation exposure, then the radiation-curable composition may be processed at a radiation exposure level less than required for the desired level of curing, which means that the cured primary coating will not be fully cured. However, if the line speed is conservatively adjusted downwards to ensure that an adequate cure is achieved, this means that the line production is correspondingly reduced at the expense of product throughput.

Because the amount of radiation exposure is equal to the radiation intensity times the exposure time, the desired or required production line speed could be achieved by increasing the radiation intensity. This would require larger radiation units, which could lead to problems and costs in designing and operating the fiber coating line. Even though adjustments in the radiation intensity or exposure can be made, there remain certain fundamental practical issues associated with a radiation curing lamp assembly which can affect the actual amount of radiation reaching the radiation-curable composition.

Specifically, the amount of radiation striking the radiation-curable composition from, for instance, a UV-curing lamp system on a fiber drawing apparatus is not constant over the operative lifetime of the lamp and may be considered to be determined by the sum of the following:

(1) reflectivity of lamp reflector system, (2) intensity of curing lamp output, and (3) surrounding enclosure of radiation-curable material.

The reflector system's ability to reflect the radiation can vary during production runs due to:

(1a) variability of reflector cleanliness, (1b) misalignment of reflector system with radiation-curable composition, (1c) solarization of the reflector system, (1d) the age of the lamp and system itself.

The radiation curing UV lamp output typically changes in intensity as the bulb ages in use during production of the coated optical glass fiber increases. Moreover, the wavelength distribution of lamp emission can change as a result of its aging during such use.

When curing radiation-curable compositions on optical glass fibers, an elliptical reflector system containing a UV curing lamp is usually used. Such a system is shown in FIG. 1, (Prior Art).

As shown in FIG. 1, the UV lamp shown at 5 is positioned at one focal point of the elliptical reflector system shown at 3. A clear center tube shown at 7 is positioned around the other focal point of the reflector system shown at 3. The optical glass fiber shown at 9, having a liquid radiation-curable composition thereon, passes through the center tube 7. The clear center tube 7 is also flushed with an inert atmosphere such as nitrogen or argon gas to reduce the oxygen inhibition of polymerization. The clear center tube 7 also provides protection of the elliptical reflector system from contamination by the liquid coating as it is applied to the fiber, e.g. by splattering.

During the radiation curing production process, the inner surface of the clear center tube 7 may, over time, become contaminated with some of coating material or its components. This contamination has the effect of thereby decreasing the amount of radiation which reaches the uncured coating on the optical glass fiber 9 after passage through the center tube 7.

Thus, there is a need for some means to monitor and determine the level of cure of the glass fiber coating during the prolonged operation of the coating line. Since, once installed, the line apparatus and its radiation source are not readily changed except by expensive shut-down of the (generally continuously operating) line itself, the amount of radiation actually striking the radiation-curable composition present on the optical glass fiber will necessarily vary, depending on the condition at any given point in time as a result of the above-described problems presented by the reflector system, lamp output, contaminated center tubes.

It is accordingly difficult to confidently meet the demand for increased production line speeds while maintaining conditions which will assuredly provide optimum complete cure of the coating. At the present time, testing of the completeness of the coating cure is commonly done by off-line physical tests on specimens of the coated fiber after it has been produced.

What would be desirable is a system which would permit real time determination of the coating's cure level by some indicator means. Knowing whether or not the required complete cure is achieved under the operating conditions will then inform the line operator of the need to make adjustments to line speed, lamp intensity (if possible) or replacement, or equipment cleaning, while not jeopardizing wasted production due to an inadequate coating cure.

There has been no effective solution to the above described problems for the glass fiber coating technology, until the present invention.

U.S. Pat. No. 5,302,627 is directed to the fabrication of printed circuit boards and similar electrical or electronic devices. This patent discloses a method for indicating a cure point of an ultraviolet radiation curable composition used with such devices. It does not disclose any use of the compositions as coatings for optical glass fibers. Nor does it address the special problems of high speed continuously-operated glass fiber coating lines and the very critical requirements for such coatings. However, no definition of the cure point is provided. Furthermore, while this patent discloses that a dye can be used which becomes colorless upon exposure to ultraviolet radiation, no examples of such dyes are provided. All of the examples merely changed color upon exposure to ultraviolet radiation. This patent only teaches that the amount of dye used should be such that it does not inhibit the curing of the composition. One skilled in the art reading and comprehending this patent would not know how to prepare a radiation-curable composition which will provide instant real time visible feedback that the amount of radiation exposed to the radiation-curable composition is or is not sufficient to cure the radiation-curable composition to the desired level.

Published Japanese Patent Application No. 1-204902 is directed to molding materials, paints and adhesives. This patent discloses a photosetting resin composition containing a photocoloring compound which changes color upon exposure to light for finding the state of curing of the composition. It does not disclose any use of the compositions as coatings for optical glass fibers. Nor does it address the special problems of high speed continuously-operated glass fiber coating lines and the very critical requirements for such coatings. While this patent discloses that a dye can be used which becomes colorless upon exposure to ultraviolet radiation, no examples of such dyes are provided. All of the examples merely changed color upon exposure to ultraviolet radiation. This patent only teaches that the amount of dye used should be 0.5 to 10 parts by weight. One skilled in the art reading and comprehending this patent would not know how to prepare a radiation-curable composition which will provide instant real time visible feedback that the amount of radiation exposed to the radiation-curable composition is or is not sufficient to cure the radiation-curable composition to the desired level.

SUMMARY OF THE INVENTION

In view of the above described problems, an objective of the present invention is to provide a simple and effective real-time means to determine whether a radiation-curable composition applied to a optical glass fiber has been exposed to the required amount of radiation sufficient to reach the necessary level of cure.

More particularly, this invention provides a technique whereby the optical glass fiber coating composition is provided with a chromophoric component which has the property of losing its visible light chromophoric functionality upon exposure to UV actinic radiation and doing so at a minimal concentration level such as to coincide with the level of radiation exposure which is required to achieve cure of the coating itself during the operation of the line. This invention thus requires two balanced selection steps: first, the selection of the suitable chromophoric component, and secondly the selection of the concentration of that component in the coating composition. At the same time, the desired protective characteristics of the coating composition itself must not be degraded by addition of the chromophoric entity.

Surprisingly, this objective, and other objectives, are achieved by the following.

The invention provides a radiation-curable, optical glass fiber coating composition comprising at least one radiation-curable oligomer or monomer; and at least one chromophoric indicator selected so as to be susceptible to destruction of its chromophoric characteristic upon exposure to actinic radiation and present in an amount which becomes substantially colorless when exposed to a level of radiation sufficient to cure said radiation-curable, optical glass fiber coating composition, wherein said at least one chromophoric indicator has a color which is distinguishable from a base color of said radiation-curable, optical glass fiber coating composition in cured form.

The invention also provides a method of formulating a radiation-curable, coating composition adapted for use on optical glass fibers so as to provide a visual indication of a desired cure, said method comprising the steps of:

providing a radiation-curable, optical glass fiber coating composition;

measuring and determining a critical radiation dose level of said radiation-curable, optical glass fiber coating composition which is the minimum level of radiation sufficient to achieve a desired cure of said radiation-curable, optical glass fiber coating composition;

selecting a chromophoric indicator having the characteristics of exhibiting a visible color while also having its chromophoric characteristics substantially destroyed upon exposure to actinic radiation, determining a concentration of a chromophoric indicator that exhibits a substantially colorless characteristic at said critical radiation dose level for curing of said composition; and incorporating at least said concentration of said chromophoric indicator into said uncured radiation-curable, optical glass fiber coating composition prior to application to a glass fiber.

The invention further provides a coated optical glass fiber comprising:

an optical glass fiber; and at least one radiation-cured coating containing a bleached chromophoric indicator, said at least one radiation-cured coating being formulated from a radiation-curable, optical glass fiber coating composition having as essential elements:

at least one radiation-curable oligomer or monomer; and at least one chromophoric indicator in an amount which becomes substantially colorless when exposed to an amount of radiation suitable for curing said radiation-curable, optical glass fiber coating composition, wherein said at least one chromophoric indicator has a color which is distinguishable from a base color of said radiation-cured coating.

The invention also provides an optical glass fiber drawing method having the steps of:

drawing an optical glass fiber from a preform;

applying a radiation-curable, optical glass fiber coating composition onto a bare optical glass fiber or onto a coated optical glass fiber; and exposing said coated optical glass fiber to radiation to cure said radiation-curable, optical glass fiber coating composition, wherein the improvement comprises;

using a radiation-curable, optical glass fiber coating composition which contains at least one chromophoric indicator in an amount which becomes substantially colorless when exposed to an amount of radiation suitable for curing said radiation-curable, optical glass fiber coating composition, wherein said at least one chromophoric indicator has a color which is distinguishable from a base color of said radiation-curable, optical glass fiber coating composition in cured form.

The invention further provides an optical glass fiber cable structure comprising;

(1) at least one coated optical glass fiber comprising:

an optical glass fiber coated at least one radiation-cured coating containing a bleached chromophoric indicator, said at least one radiation-cured coating being formulated from a radiation-curable, optical glass fiber coating composition having as essential elements:

(i) at least one radiation-curable oligomer or monomer; and (ii) at least one chromophoric indicator in an amount which becomes substantially colorless when exposed to an amount of radiation suitable for curing said radiation-curable, optical glass fiber coating composition, wherein said at least one chromophoric indicator has a color which is distinguishable from a base color of said radiation-cured coating; and (2) a sheath covering said at least one optical glass fiber.

Also provided is a telecommunications system comprising:

at least one optical glass fiber coated with at least one radiation-cured coating containing a bleached chromophoric indicator, said at least one radiation-cured coating being formulated from a radiation-curable, optical glass fiber coating composition having as essential elements:

at least one radiation-curable oligomer or monomer; and at least one chromophoric indicator in an amount which becomes substantially colorless when exposed to an amount of radiation suitable for curing said radiation-curable, optical glass fiber coating composition, wherein said at least one chromophoric indicator has a color which is distinguishable from a base color of said radiation-cured coating.

DETAILED DESCRIPTION OF PREFERRED EMBODIMENTS

Figure 2:
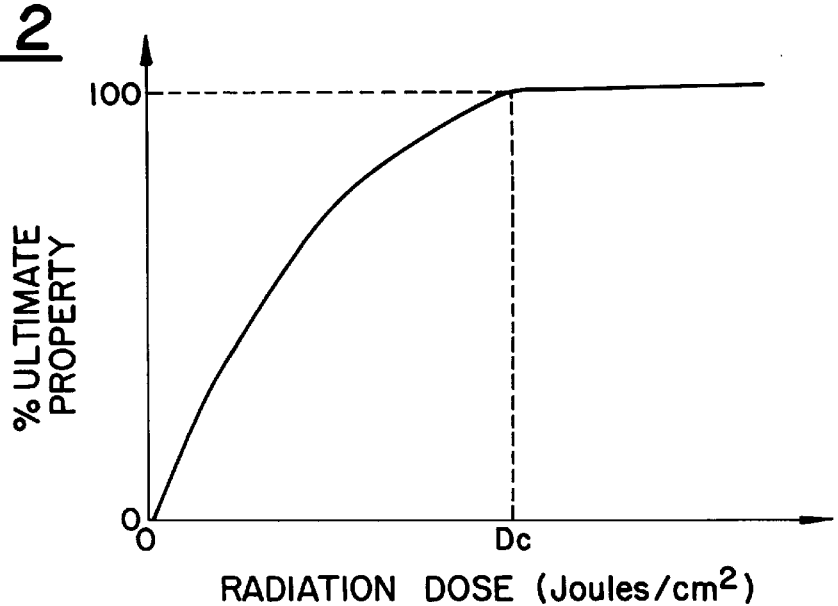
FIG. 2 illustrates a graph of an ultimate property of a radiation-cured composition versus the radiation dose applied to cure the radiation-curable composition.

Radiation-curable compositions usually exhibit the behavior shown in FIG. 2. As shown in FIG. 2, as the amount of radiation that a radiation-curable composition is exposed to is increased, the amount of a specific physical or performance property of the cured coating (measured as a percentage of the fully attainable value for the specific composition) correspondingly increases. This increase continues until the ultimate value of the measured physical or performance property is achieved. The ultimate value is defined as the maximum value of a physical or performance property, which cannot be exceeded by further exposure to radiation. Examples of measured physical or performance properties are modulus, glass transition temperature, hardness, surface adhesion, and remaining extractables.

As shown in FIG. 2, once the measured physical property or performance property reaches the ultimate value, further exposure to radiation does not result in an increase in the measured property or performance. The lowest radiation dose which achieves the level of curing sufficient to provide the ultimate value is hereinafter referred to as the critical radiation dose "Dc", and can be easily obtained from the graph in FIG. 2. Dc is used herein to represent minimum level of radiation exposure to fully cure the radiation-curable composition. By adjusting the radiation exposure in the fiber coating line closely to the Dc, and being able to determine in real time that the Dc is just being maintained to effect the desired full cure, the linear line speed can be maximized without jeopardizing the product quality.

Figure 3:
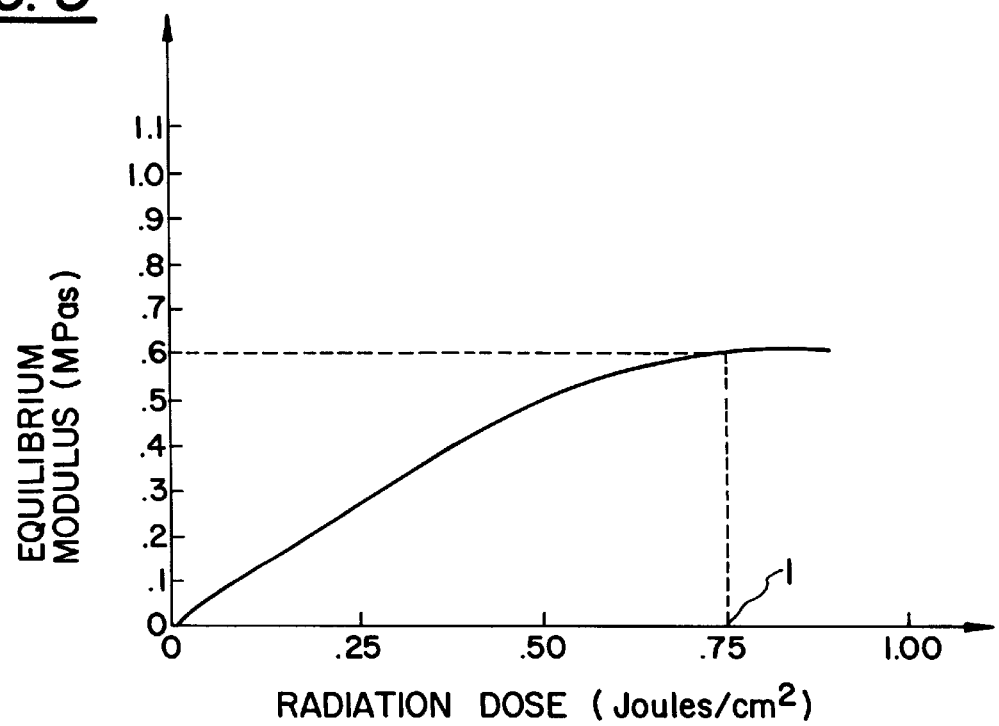
FIG. 3 illustrates a graph of the equilibrium modulus of a radiation-cured composition versus the radiation dose applied to cure the radiation-curable composition.

The following example demonstrates a simple way to determine the Dc required to achieve the ultimate value for the property of equilibrium modulus, according to this invention. FIG. 3 shows the graph of equilibrium modulus (MPas), (megapascals), versus the radiation dose (Joules/cm$^2$).

The ultimate value for the equilibrium modulus of this example material is 0.6 MPas, at a critical radiation dose, Dc, of 0.75 Joules/cm2. The Dc can be easily read from the graph in FIG. 3, as shown at 1. The requirement for a fiber production engineer using is to produce a fully cured coating on an optical glass fiber and hence to ensure that the radiation-curable composition is always exposed to a radiation dosage of at least the Dc, which is here 0.75 Joules/cm$^2$.

According to this invention determination of the level of adequate radiation cure of the radiation-curable composition, i.e. that it has been exposed to at least the Dc level of radiation, a chromophoric indicator is incorporated into that composition, said indicator having been selected so as to have the characteristic of substantially, and permanently, losing its chromophoric characteristic (at the concentration employed) upon exposure to that Dc radiation level, so as to become essentially colorless in visible light.

The use of such a chromophoric indicator according to the present invention is applicable to all radiation-curable, optical glass fiber coating compositions.

Examples of suitable radiation-curable compositions which may be used variously include those which are disclosed in U.S. Pat. Nos. 4,624,994; 4,682,851; 4,782,129; 4,794,133; 4,806,574; 4,849,462; 5,219,896; and 5,336,563, all of which are incorporated herein by reference.

Such radiation-curable compositions contain one or more radiation-curable oligomers or monomers having at least one functional group capable of polymerization when exposed to actinic radiation. Suitable radiation-curable oligomers or monomers are now well known and within the skill of the art.

Commonly, the radiation-curable functionality used is ethylenic unsaturation, which can be polymerized through radical polymerization or cationic polymerization. Specific examples of suitable ethylenic unsaturation are groups containing acrylate, methacrylate, styrene, vinylether, vinyl ester, N-substituted acrylamide, N-vinyl amide, maleate esters, and fumarate esters. Preferably, the ethylenic unsaturation is provided by a group containing acrylate, methacrylate, or styrene functionality.

Another type of functionality generally used is provided by, for example, epoxy groups, or thiol-ene or amine-ene systems. Epoxy groups in can be polymerized through cationic polymerization, whereas the thiol-ene and amine-ene systems are usually polymerized through radical polymerization. The epoxy groups can be, for example, homopolymerized. In the thiol-ene and amine-ene systems, for example, polymerization can occur between a group containing allylic unsaturation and a group containing a tertiary amine or thiol.

The radiation-curable compositions may also contain a reactive diluent which is used to adjust the viscosity. The reactive diluent can be a low viscosity monomer containing having at least one functional group capable of polymerization when exposed to actinic radiation. This functional group may be of the same nature as that used in the radiation-curable monomer or oligomer. Preferably, the functional group present in the reactive diluent is capable of copolymerizing with the radiation-curable functional group present on the radiation-curable monomer or oligomer.

For example, the reactive diluent can be a monomer or mixture of monomers having an acrylate or vinyl ether functionality and an $C_4$–$C_{20}$ alkyl or polyether moiety. Particular examples of such reactive diluents include:

hexylacrylate,
2-ethylhexylacrylate,
isobornylacrylate,
decyl-acrylate,
laurylacrylate,
stearylacrylate,
2-ethoxyethoxy-ethylacrylate,
laurylvinylether,
2-ethylhexylvinyl ether,
N-vinyl formamide,
isodecyl acrylate,
isooctyl acrylate,
vinyl-caprolactam,
N-vinylpyrrolidone,
and the like.

Another type of reactive diluent that can be used is a compound having an aromatic group. Particular examples of reactive diluents having an aromatic group include: ethyleneglycolphenyletheracrylate, polyethyleneglycolphenyletheracrylate, polypropyleneglycolphenylether-acrylate, and alkyl-substituted phenyl derivatives of the above monomers, such as polyethyleneglycolnonylphenyletheracrylate.

The reactive diluent can also comprise a diluent having two or more functional groups capable of polymerization. Particular examples of such monomers include:

$C_2$–$C_{18}$ hydrocarbon-dioldiacrylates,
$C_4$–$C_{18}$ hydrocarbondivinylethers,
$C_3$–$C_{18}$ hydrocarbon triacrylates, and the polyether analogues thereof, and the like, such as
1,6-hexanedioldiacrylate,
trimethylolpropanetri-acrylate,
hexanedioldivinylether,
triethylene-glycoldiacrylate,
pentaerythritol-triacrylate,
ethoxylated bisphenol-A diacrylate, and
tripropyleneglycol diacrylate.

If the radiation-curable functional group of the radiation-curable monomer or oligomer is an epoxy group, for example, one or more of the following compounds can be used as the reactive diluent:

epoxy-cyclohexane,
phenylepoxyethane,
1,2-epoxy-4-vinylcyclohexane,
glycidylacrylate,
1,2-epoxy-4-epoxyethyl-cyclohexane,
diglycidylether of polyethylene-glycol,
diglycidylether of bisphenol-A,
and the like.

If the radiation-curable functional group of the radiation-curable monomer or oligomer has an amine-ene or thiol-ene system, examples of reactive diluents having allylic unsaturation that can be used include:

diallylphthalate,
triallyltri-mellitate,
triallylcyanurate,
triallylisocyanurate, and diallylisophthalate.

For amine-ene systems, amine functional diluents that can be used include, for example:

the adduct of trimethylolpropane, isophorondiisocyanate and di(m)ethylethanolamine, the adduct of hexanediol, isophorondiisocyanate and dipropylethanolamine, and the adduct of trimethylol propane, trimethylhexamethylenediisocyanate and di(m) ethylethanolamine.

Other additives which can be used in the coating composition include, but are not limited to, photoinitiators, catalysts, lubricants, wetting agents, antioxidants and stabilizers. The selection and use of such additives is within the skill of the art.

Generally, according to the present invention, a specific concentration of the chromophoric indicator is incorporated within the desired radiation-curable composition. The chromophoric indicator is selected so as to display a color to the human eye prior to exposure to the radiation cure, e.g. a color having a wavelength in the range of about 400 to about 700 nm. During exposure to radiation, the chromophoric indicator changes from colored to substantially colorless, hereinafter referred to as bleaching. The color of the chromophoric indicator must be distinguishable from any desired base color of the cured coating composition, so that a distinct color change can easily be seen prior to exposure of the radiation-curable composition to the Dc level of radiation.

The concentration of the chromophoric indicator present within the radiation-curable composition can be adjusted so that the bleaching of the chromophoric indicator occurs at a radiation level which is substantially equal to or greater than the critical radiation dose Dc for the radiation-curable composition. Thereby, the disappearance of the visible color serves as an indicator or a complete cure of the radiation-curable composition. Preferably, the concentration of the chromophoric indicator present in the radiation-curable composition is adjusted so that the bleaching of the chromophoric indicator occurs at a radiation level which is substantially equal to the critical radiation dose Dc for the radiation-curable composition.

Based on the disclosure herein, one skilled in the art will easily be able to select and to determine the concentration of chromophoric indicator which becomes substantially colorless at the radiation level "Dc" required to fully cure the selected radiation-curable composition.

Figure 4:
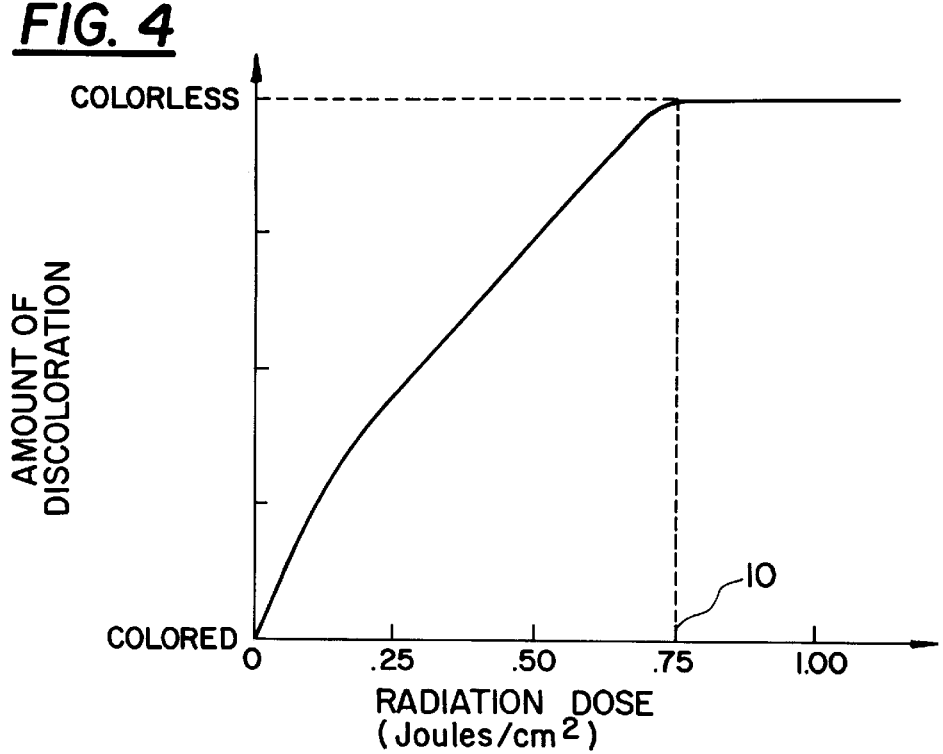
FIG. 4 illustrates a graph of the amount of discoloration of a specific concentration of a chromophoric indicator versus the radiation dose applied to the chromophoric indicator.

For a specific chromophoric indicator at a specific concentration, the amount of bleaching of the chromophoric indicator can be represented by the response curve shown in FIG. 4. This response curve can be easily determined and measured by one skilled in the art by exposing a specific concentration of the chromophoric indicator to varying levels of radiation, measuring the amount of bleaching that has occurred, and then plotting the results. The amount of radiation required to completely bleach the specific concentration of chromophoric indicator can be easily read from the graph, as shown at 10.

Figure 5:
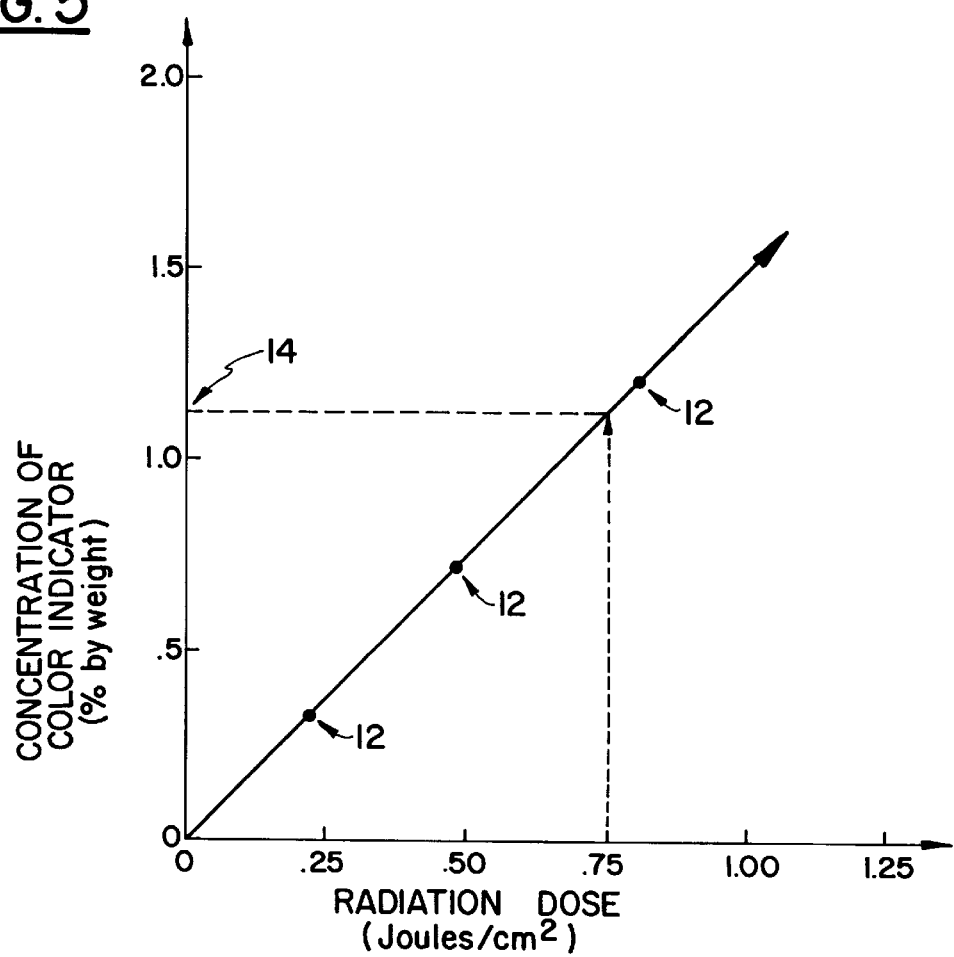
FIG. 5 illustrates a graph of the concentration of a chromophoric indicator versus the radiation dose required to completely bleach the chromophoric indicator.

Generally, an increase in the concentration of the chromophoric indicator will result in an increase in the amount of radiation required to bleach the chromophoric indicator. Different concentrations of the chromophoric indicator can then be tested in the same manner as above to determine the amounts of radiation required to completely bleach the different concentrations. The results can be plotted, as shown in FIG. 5 at number 12, to make a concentration/radiation dose curve. This concentration/radiation dose curve can be used to easily determine the approximate concentration of the chromophoric indicator that will become colorless at the selected radiation dose level. For example, if the critical radiation dose Dc of the radiation curable composition is 0.75 Joules/cm$^2$, the dose response curve can be used as shown by the dotted line to determine the concentration of chromophoric indicator that will become colorless at this radiation dose level, shown at 14 in FIG. 5. For this specific example, that concentration of the chromophoric indicator is about 1.25% by weight. The same type of radiation that will be used to cure the radiation-curable composition should be used to determine the concentration/radiation dose curve.

The required amount of radiation to bleach the specific concentration of the chromophoric indicator in the radiation-curable composition may vary from the estimate provided by the concentration/radiation dose curve due to effects from the components in the radiation-curable composition. Therefore, the final concentration of the chromophoric indicator should be experimentally fine-tuned by measuring the amount of radiation required to bleach the chromophoric indicator in the desired radiation-curable composition and then increasing the concentration of the chromophoric indicator if the bleaching occurs at too low of a radiation dose or decreasing the concentration of the chromophoric indicator if the bleaching occurs at too high of a radiation dose.

Suitable amounts of the chromophoric indicator have been found to be between about 0.1 and 5% by weight of the total radiation-curable composition. Preferably, the amount of chromophoric indicator is between about 0.1 and 2% by weight.

The chromophoric indicator can be any dye or pigment which bleaches or becomes colorless when exposed to radiation, in particular the type of radiation used to cure the radiation-curable composition. For example, the chromophoric indicator can be an organic dye which becomes colorless upon exposure to UV radiation.

Preferably, the chromophoric indicator is a polymeric dye. The term polymeric dye is used herein to represent those dyes having a polymeric (polyol) backbone into which at least one chromophoric molecular entity has been chemically incorporated. The polymeric dye preferably has molecular weight between about 1000 to about 2500, and more preferably about 1200 to about 2200.

Examples of suitable polymeric dyes are disclosed in U.S. Pat. No. 4,507,407, the complete disclosure of which is incorporated herein by reference.

Commercial examples of suitable polymeric dyes presently include:

Reactint Blue X3LV;

Reactint Blue X17AB;

Reactint Orange X38;

Reactint Red X64;

Reactint Violet X80LT; and

Reactint Yellow X15, available from Milliken Chemicals.

An advantage of using a polymeric dye is that the backbone can become entangled within, or even reacted with, the cross-linked coating composition. This significantly reduces or eliminates the possibility that the chromophoric indicator would contribute to cured coating volatiles.

The polymeric dye can be easily modified by incorporating into the polymeric backbone at least one functional group capable of polymerization exposed to radiation. The radiation-curable functional group can be any one of those described herein above. In this manner, the polymeric dye can be cross-linked with the radiation-curable oligomers and monomers present in the coating composition upon exposure to radiation.

Figure 1:
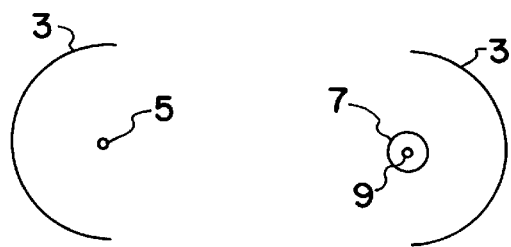
FIG. 1 (Prior Art) illustrates a schematic diagram of a conventional elliptical reflector system containing a UV curing lamp.
Figure 6:
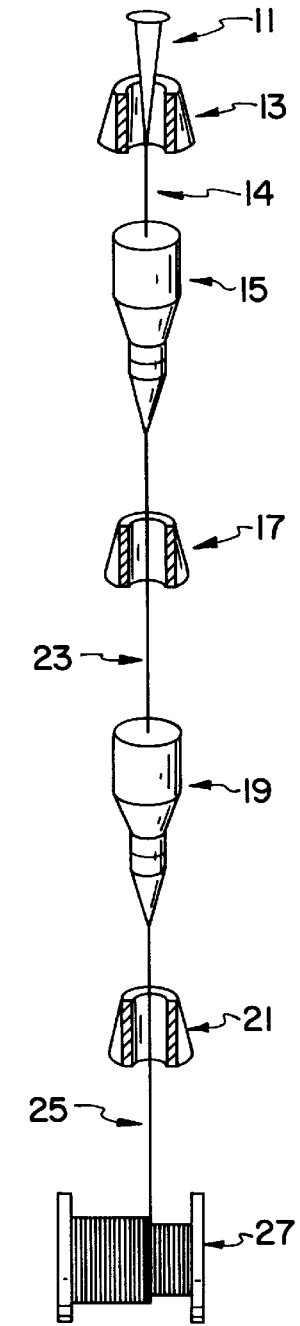
FIG. 6 illustrates a schematic diagram of an optical glass fiber drawing tower used to practice an embodiment of the present invention.

FIG. 6 shows a schematic illustration of how the present invention can be practiced on a optical glass drawing and coating tower apparatus. In FIG. 6, the preform shown at 11 is heated in the furnace shown at 13 and drawn therefrom to produce an uncoated optical glass fiber 14. An inner primary composition which has been modified according to this invention to contain a chromophoric indicator is applied to the virgin surface of the bare optical glass fiber by use of the coating applicator shown at 15. The inner primary coating is cured by exposure to actinic radiation, as shown at 17. An outer primary composition which has been modified according to this invention to contain a chromophoric indicator is then applied to the cured inner primary coating using the coating applicator shown at 19. The outer primary composition is then cured by exposure to actinic radiation, shown at 21. The thus coated optical glass fiber is then wound by a take-up, as shown at 27.

The coated optical fiber can be visually inspected at the location shown at 23 to determine whether the inner primary coating has been completely cured. A suitable wave-length sensitive device could also be used at this point. If the color of the cured inner primary coating containing the chromophoric indicator is the same as the base color (without chromophoric indicator) of a fully cured inner primary coating, then the inner primary coating composition has been exposed to sufficient actinic radiation to provide a complete cure.

The coated optical fiber can also be similarly inspected at the location shown at 25 to determine whether the outer primary coating has been completely cured. If the color of the cured outer primary coating containing a chromophoric indicator is same as the base color (without chromophoric indicator) of a fully cured outer primary coating, then the outer primary coating composition has been exposed to sufficient actinic radiation to provide a complete cure.

The invention is not limited to using both inner primary and outer primary coatings having a chromophoric indicator according to this invention. For the desired application, it may be sufficient to use only one, or more than two, coating compositions containing a chromophoric indicator according to this invention. In the event it is desired to produce a color-coated glass fiber, it will then be appropriate to employ a chromophoric indicator having the characteristic of exhibiting a color which will sufficiently modify the desired fiber color so as to be readily detected by a shift in the tint or hue of the resulting combination of chromophores under the condition that the chromophoric indicator has received insufficient radiation to induce substantial bleaching thereof.

If a wave-length sensitive device is used to determine whether the color indicator has been bleached (i.e., whether the coating has been completely cured), the device can be used to send a signal to the operator (manual or automated) of the drawing tower. For example, the wave-length sensitive device can be connected to a controller for the radiation intensity such that when the color indicator is insufficiently bleached, the radiation intensity can be adjusted by the wave-length sensitive device to provide the level of bleaching desired. Alternatively, by connecting the wave-length sensitive device to a controller for the line speed of the drawing tower, the wave-length sensitive device can signal an adjustment of the line speed to the maximum speed which will still achieve a complete cure.

Another example of how the present invention can be practiced on an optical glass drawing and coating tower apparatus is as follows (not shown). The inner and outer primary coatings can be consecutively applied to the bare optical glass fiber and then cured in one step by exposing both coatings to radiation simultaneously. Usually, the inner primary coating cures at a slower rate than the outer primary coating and therefore the inner primary coating typically requires a greater radiation dose than the outer primary coating to achieve a complete cure. In this situation, it may be sufficient to only use the chromophoric indicator according to the present invention in the inner primary coating because when the chromophoric indicator indicates that the inner primary coating has achieved complete cure then the outer primary coating will also be completely cured.

The coated optical glass fibers made according to this invention can be used in telecommunication systems. Such telecommunication systems typically include cables containing optical glass fibers, transmitters, receivers, and switches. The cables containing the optical glass fiber are the fundamental connecting units of telecommunication systems.

The coated optical glass fibers made according to this invention can be adapted for enclosure within a cabled structure. The cabled structure can be buried under ground or water for long distance connections, such as between cities. Alternatively, the coated optical glass fibers can be adapted for use in local area networks, such as for connecting offices in high rise buildings, residential subdivisions, and the like. Furthermore, the coated optical glass fibers can be adapted for use in ribbon cable applications.

The present invention will be further described by the following non-limiting example.

Example 1 wt % of Reactint X38 Orange (Milliken Chemicals) was added to the following composition:

40–60 wt % urethane acrylate oligomer;

35–55 wt % mono functional acrylate;

2–4 wt % photoinitiator; and 0.75–1.5 wt % additive.

The critical dose of radiation Dc for the composition is 1.0 Joule/cm$^2$.

The mixture was exposed to 1.0 Joule/cm of UV radiation. The orange color was not completely bleached at this radiation level. Therefore, the composition was then exposed another 1.0 Joule/cm$_2$, which completely bleached the orange dye.

I claim:

1. An optical glass fiber cable structure comprising:
   (1) at least one coated optical glass fiber comprising:
      an optical glass fiber coated at least one radiation-cured coating containing a bleached chromophoric indicator,
   said at least one radiation-cured coating being formulated from a radiation-curable, optical glass fiber coating composition having as essential elements:
      (i) at least one radiation-curable oligomer or monomer; and
      (ii) at least one chromophoric indicator in an amount which becomes substantially colorless when exposed to an amount of radiation suitable for curing said radiation-curable, optical glass fiber coating composition, wherein said at least one chromophoric indicator has a color which is distinguishable from a base color of said radiation-cured coating; and
   (2) a sheath covering said at least one optical glass fiber.

2. An optical glass fiber cable according to claim 1, wherein said chromophoric indicator comprises a polymeric dye.

3. A telecommunications system comprising:

at least one optical glass fiber coated with at least one radiation-cured coating containing a bleached chromophoric indicator, said at least one radiation-cured coating being formulated from a radiation-curable, optical glass fiber coating composition having as essential elements:

at least one radiation-curable oligomer or monomer; and at least one chromophoric indicator in an amount which becomes substantially colorless when exposed to an amount of radiation suitable for curing said radiation-curable, optical glass fiber coating composition, wherein said at least one chromophoric indicator has a color which is distinguishable from a base color of said radiation-cured coating.

* * * * *